United States Patent [19]

Kelly et al.

[11] Patent Number: 5,050,205
[45] Date of Patent: Sep. 17, 1991

[54] DIAL LINE MONITOR AND CONTROL UNIT

[75] Inventors: Robert J. Kelly, Old Tappan; Tadhg D. Kelly, Randolph, both of N.J.

[73] Assignee: Communication Devices, Inc., Clifton, N.J.

[21] Appl. No.: 603,410

[22] Filed: Oct. 25, 1990

[51] Int. Cl.5 .................... H04M 3/08; H04M 3/24; G06F 11/00

[52] U.S. Cl. .......................... 379/2; 379/32; 379/28; 371/8.2

[58] Field of Search ............ 379/22, 27, 28, 29, 379/32, 2; 371/22.3, 15.1, 8.1, 8.2

[56] References Cited

U.S. PATENT DOCUMENTS 4,451,708  5/1984  Kemler et al. ...................... 379/2
4,819,235  4/1989  Kelly et al. ....................... 379/1 X
5,001,741  3/1991  Sayer ............................... 379/27 X Primary Examiner—Stafford D. Schreyer
Attorney, Agent, or Firm—Siegmar Silber

[57] ABSTRACT

A modem use monitor (MUM) is disclosed which is utilizable with one or more groups of modems for analyzing modem defects of the individual modems. Typically, a rotary hunt arrangement of telephone lines for data communications is sequentially served by several modems. For analytical purposes, an intercept device is provided to receive a data carrier detect signal from each modem. The intercept device has been enhanced to receive a plurality of signals and to facilitate defect analysis. Exemplary of the processed signals is the summing of the ring indicator (RI) signal and the data carrier detect (DCD) by means of a logical OR to provide a single test signal which can be examined for a ring-no-answer condition.

28 Claims, 3 Drawing Sheets

DIAL LINE MONITOR AND CONTROL UNIT

BACKGROUND OF THE INVENTION

Field of the Invention

The present invention is related to the monitoring and analysis of status of a telephone line group and of equipment attached thereto, and more particularly to a microcomputer-based system that provides telephone line usage information and, where applicable equipment usage, such as modem use information. Such information is provided in the form of an error log and in the form of recorded data obtained directly or derived from the monitoring activity. A computer-generated, 24-hour error report chart shows the in-use condition of each piece of equipment or modem. From the error log or chart, one can determine which piece or pieces of equipment in the system are faulty, and whether too many, a sufficient number, or an insufficient number of units have been employed. The system provides a "hot" spare which is usable when a modem fails to function satisfactorily and is usable until the faulty modem can be repaired. In the development of the dial line monitor and control unit, a novel approach to the required voice frequency intercept connectors and related isolation-type circuitry was necessary to comply with applicable industry regulations.

INFORMATION DISCLOSURE STATEMENT

In preparing for the instant application, a pre-examination patentability search was performed. In performing the search, the following fields and periods were covered by the search.

| CLASS/SUBCLASS | PERIOD COVERED |
| --- | --- |
| 371/201 | 03/21/1967 to 11/14/1989 |
| 379/28 | 04/21/1970 to 10/03/1989 |
| 379/112 | 07/22/1958 to 12/26/1989 |

Upon search, the following patents were uncovered:

| ITEM NO. | U.S. PAT. NO. | INVENTOR | ISSUE DATE |
| --- | --- | --- | --- |
| 1 | 3,952,163 | Robert A. Couturier et al. | 04/20/1976 |
| 2 | 4,311,882 | Wilfried Johner et al. | 01/19/1982 |
| 3 | 4,404,433 | Leon Wheeler et al. | 09/13/1983 |
| 4 | 4,510,351 | Peter E. Costello et al. | 04/09/1985 |
| 5 | 4,710,929 | Robert J. Kelly et al. | 12/01/1987 |
| 6 | 4,712,230 | John E. Rice et al. | 12/08/1987 |
| 7 | 4,739,509 | James W. Bourg | 04/19/1988 |
| 8 | 4,819,235 | Robert J. Kelly et al. | 04/04/1989 |

The patent to Johner et al. '882 shows a traffic route tester whereby the central unit NQTC and the remote units NQTR communicate through test cells. Then, data is collected and arrayed at the central unit NQTC. In Courturier et al. '163, a frequency division multiplexer (FDM) is described for use with private line data networks in which several remote terminals are connected over narrow band private lines to a central processing unit. Couturier et al. '163 provides an indication of a modem is ready condition; and, after modem testing, an OUT OF SERVICE signal. Neither the route testing device nor the FDM device teach toward the device or the method of the Applicant.

The Bourg '509 patent is a personal-computer based business communications system which provides alternate destinations for the call and the connecting party. The communications management arrangement for the incoming calls to PC51 is also described. Of the remaining references, Rice et al. '230 describes an off-hook detector, and Costello et al. '351 and Wheeler et al. '433 are only of interest, these patents apply to voice rather than data communication. The prior patents to the inventors hereof are directed solely toward dial-in modems with intercepts therefor only on the RS-232 side thereof. In this disclosure, the manner of obtaining the analytical information is different as are the applications of the present system. These applications were not feasible with the inventors' prior modem use monitor and the intercept device.

SUMMARY

The present disclosure describes a system, namely, a Dial Line Monitor and Control UNIT (DLMCU) for analyzing the use of a group of telephone lines and defects of attached corresponding equipment, such equipment includes dial-in modems, lease-line modems, facsimile devices, and telephones. The telephone lines generate line signals representing a RING condition and an ON/OFF HOOK condition. Unlike past modem use monitors, the disclosed system also provides intercepts on the voice frequency side, which intercepts create condition signals for RING and ON/OFF HOOK conditions without intruding on the telephone lines. Here, the condition signals are provided by circuits with opto-isolation coupling—a technique which is transparent to the telephone line circuits. The central processing unit (CPU) processes each condition signal and provides a response which is identifiable to the telephone line and the associated equipment. The information gathered is stored in a register and is later examined to form a use-reporting record, specifically, a 24 hour summary and to form an error log (or defect-reporting record) identifying units with RING NO ANSWER conditions. The use-reporting provides the communications system manager with line and equipment utilization information. The defect reporting provides unit failures, connected device failures, and link failures.

The system includes a "hot" spare capability so that when an incoming call, upon being sequentially directed by the rotary hunt mechanism, receives a RING NO ANSWER response, the incoming call is switched to another modem. In the best mode described hereinbelow, the call is switched to the last modem in the rotary hunt group. The system has the capacity to "busy out" the offending malfunctioning line, then upon the next sequential run through the rotary hunt group the line will be in use. The modem after receiving necessary maintenance is then readily inserted back into the group. The system also has the capacity to disconnect automatically when data transmission has ceased for a predetermined period of time, yet the normal disconnect has not occurred. Upon such an occurrence, the disconnect is initiated by the DLMCU device and not by the calling party.

The DLMCU is capable of serving mixed equipment by proper arrangement of the voice frequency intercept and the RS-232 intercepts. Typically for dial-in modems, in addition to viewing the RING and ON/OFF HOOK conditions, the RS-232 intercept enables viewing the data terminal ready (DTR) signal. Likewise and typically for the lease-line modems, the RS-232 intercept enables viewing the data carrier detect (DCD) signal.

OBJECT AND FEATURES OF THE INVENTION

It is an object of the present invention to provide a system for monitoring the usage of a group of telephone lines and defects of equipment attached to respective ones thereof.

It is a further object of the present invention to provide use reports in the form of "24-Hour Summaries" and defect reports in the form of "Error Logs".

It is yet another object of the present invention to provide a method of economically analyzing a variety of equipment connected to telephone lines including, but not limited to, dial-in modems, lease-line modems, facsimile machines, and direct dial lines.

It is still yet another object of the present invention to provide a system that utilizes both voice frequency intercepts and auxiliary (RS-232) intercepts.

It is a feature of the present invention that a "hot" spare is available and is automatically switched to when a defective modem is addressed.

It is another feature of the present invention for the voice frequency intercepts to generate condition signals without interfering with or intruding upon telephone lines.

Other objects and features of the invention will become apparent upon review of the drawings and the detailed description which follow.

DESCRIPTION OF THE DRAWINGS AND TABLES

In the following drawings, the same parts in the various views are afforded the same reference designators.

Figure 1:
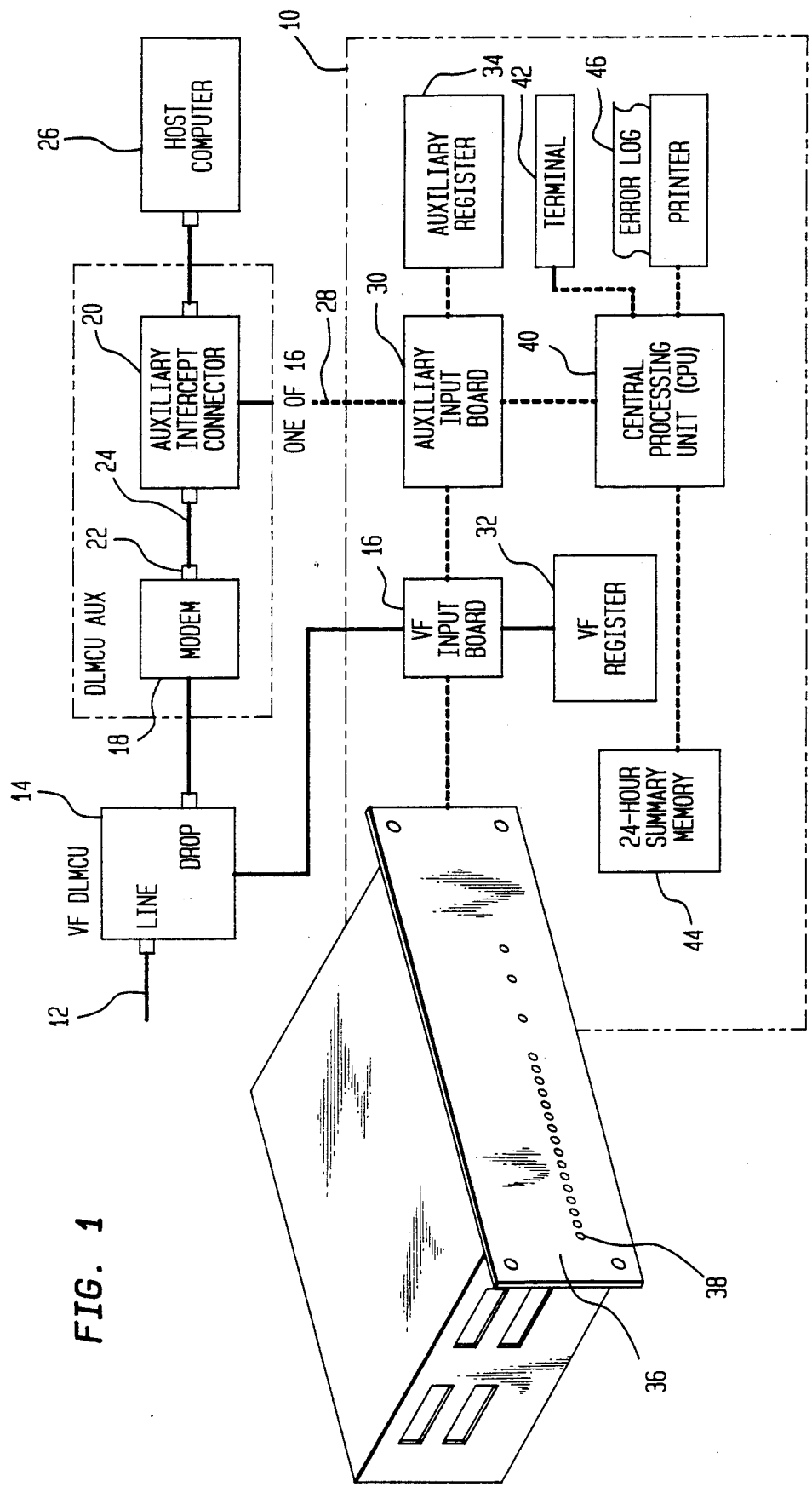
FIG. 1 is a system block diagram of the dial line monitor and control unit of the present invention and further shows the relationship among group of telephone lines and the corresponding equipment, the voice frequency and auxiliary intercept connectors, the host computer, and the dial line monitor and control unit.

TABLE 1 is a 24-hour report for a variety of equipment monitored by the dial line monitor and control unit; and, TABLE 2 is an error log for a variety of equipment monitored by the dial line monitor and control unit.

DESCRIPTION OF THE PREFERRED EMBODIMENTS

In general terms, the Dial Line Monitor and Control Unit (DLMCU) system of the present invention is applied to groups of telephone lines. These are each attached directly to one of a number of corresponding equipment, including dial-in modems, lease-line modems, facsimile machines, and telephones. Where several of the same type of corresponding equipment are accessed through the same telephone number, as for example a group of dial-in modems, the group of telephone lines are arranged for automatic answering through a dial up (rotary hunt) system. The DLMCU system enables one to isolate problems and ascertain (1) whether the problems are in the corresponding equipment or the telephone company lines; (2) the nature of the equipment problem; (3) indication if too many or too few pieces of equipment are dedicated to the application; and, (4) indication of trends as to increasing or decreasing use of the overall application.

Further, the telephone rotary hunt group is a single telephone number (first line) with circuitry providing access to a number of associated telephone lines. When the number of the first line is dialed, the circuitry searches for an unused telephone line in the group. When an empty line is found, the incoming call is connected thereat and the hunt group processes the next call starting again at the first line. For data communications, automatically answering modems are usually connected sequentially to the telephone lines in a rotary hunt group. If the modem is ready to receive data, the telephone ring is automatically answered and the caller is connected to the modem. Because the automatic answering systems—modems, rotary hunt groups and computers—are by design largely unattended, equipment failures or insufficiencies are often unnoticed. Problems are often only brought to light when users, who have been repeatedly frustrated in their attempts to gain access, report the problem. Of the problems attributable to modems, besides insufficiencies, there are two main equipment failure categories, namely (1) a "ring-no-answer" condition, and (2) "lock-up" or no disconnect after caller has disconnected. Of the equipment failures the ring-no-answer condition is the most severe as the unattended telephone equipment will continue to ring the modem whenever it appears in the hunt sequence. With a ring-no-answer condition, the user ringing the defective modem will not be able to gain access to the computer. Conversely, the lock-up condition only removes from service the modem and the telephone line affected, while the user can gain access through adjacent modems and lines. Thus, the lock-up condition reduces system efficiency, whereas the ring-no-answer condition reduces user access and system efficiency.

In the system arrangement described hereinbelow, an array of various equipment is attached to the DLMCU. While the grouping is provided as being exemplary for the system, it is understood that different groupings can be arranged. For example, the DLMCU could be used to monitor one or more rotary hunt groups having a total of sixteen dial-in modems.

Referring now to FIG. 1, a system block diagram is shown with the dial line monitor and control unit (DLMCU) referred to generally by the numeral 10. In the example at hand, the DLMCU serves up to sixteen incoming telephone lines 12. To each line, a voice frequency intercept device 14 is connected. The telephone line 12 generates two line signals which are noninvasively detected at the voice frequency intercept 14. The voice frequency intercept 14 from the opto-isolator circuitry therewithin, develops condition signals for the RING condition and the OFF HOOK condition which is transmitted to the VF input board 16. The development of these condition signals are corresponding equipment independent and provide network management information which augment the technology in our prior patents, U.S. Pat. Nos. 4,710,929 and 4,819,235. As will become clear in this description, the prior modem-dependent technology can be used as part of for side-by-side with the voice frequency technology hereof. For each telephone line 12; a piece of corresponding equipment 18 is connected. This equipment can consist of one or more groups under the network management. For example, Group 1 may consist of four direct dial telephones; Group 2, two facsimile machines; Group 3, eight dial-in modems; and, Group 4, two lease-line modems.

The telephone lines 12 for the dial-in modems (Group 3 of item 18) are arranged in a rotary hunt group. With the corresponding equipment or dial-in modems 18, an auxiliary intercept 20 is provided on the output or RS-232 connector side 22 of the device. On the same side of the device, the dial-in modem is connected by standard RS-232 cabling 24 to the host computer or data terminal equipment 26. Because of the information available on the voice frequency side of the equipment, the auxiliary input in the case of dial-in modems is now used to intercept the DATA TERMINAL READY (DTR) or the monitored auxiliary signal 28. The auxiliary signal 28 is provided to the auxiliary input board 30. The information gathered at the VF input board 16 and the auxiliary input board 30 is now stored in respective registers, namely, the voice frequency register 32 and the auxiliary register 34. Upon receiving the OFF HOOK information, the VF input board provides the signal to the display portion 36 where light emitting diode (LED) 38 indicates that the respective piece of equipment is "in use". The information from input board 16 and 30 is directed to a microcomputer or central processing unit (CPU) 40. The CPU is also provided with information through terminal 42, particularly time and information to set the real time clock and calendar portion of the CPU. After processing the data, information as to performance of each piece of equipment being monitored is provided to the 24-hour summary memory 44 and to the printer 46 which, in turn, provides a summary chart and an error log.

Figure 2:
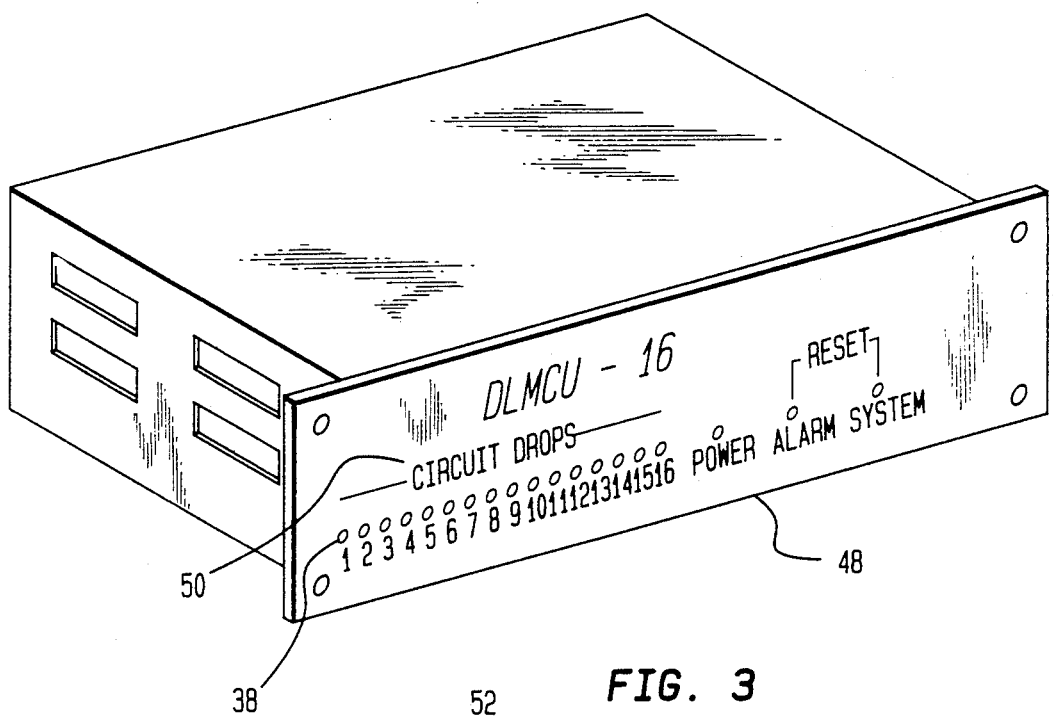
FIG. 2 is front view of the dial line monitor and control unit and particularly shows the front panel array of indicators.

Reference is now made to FIG. 2 in which further details of the dial line monitor and control unit (DLMCU) 10 are shown. The front panel 48 has an array 50 of the light emitting diodes 38 with each LED identified as to a particular piece of equipment being monitored. The array 50 is constructed so that, when a particular in-use condition signal is received, the corresponding LED is illuminated. Besides displaying the in-use condition of the modem, the DLMCU 10 takes the information and places the data into the status registers which, in turn, is compiled as error log.

Figure 3:
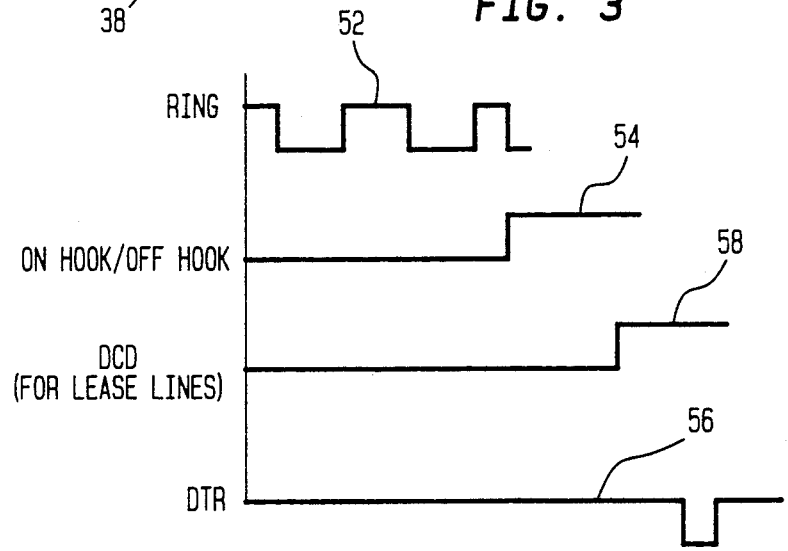
FIG. 3 is a timing diagram showing the relationship between the RING condition signal, the ON/OFF HOOK condition signal and the DATA TERMINAL READY (DTR) signal and, for lease-line modems, the DATA CARRIER DETECT (DCD) signals; and, FIG. 4 is a schematic diagram showing the relay configuration for the swapout and disconnect circuitry.
Figure 4:
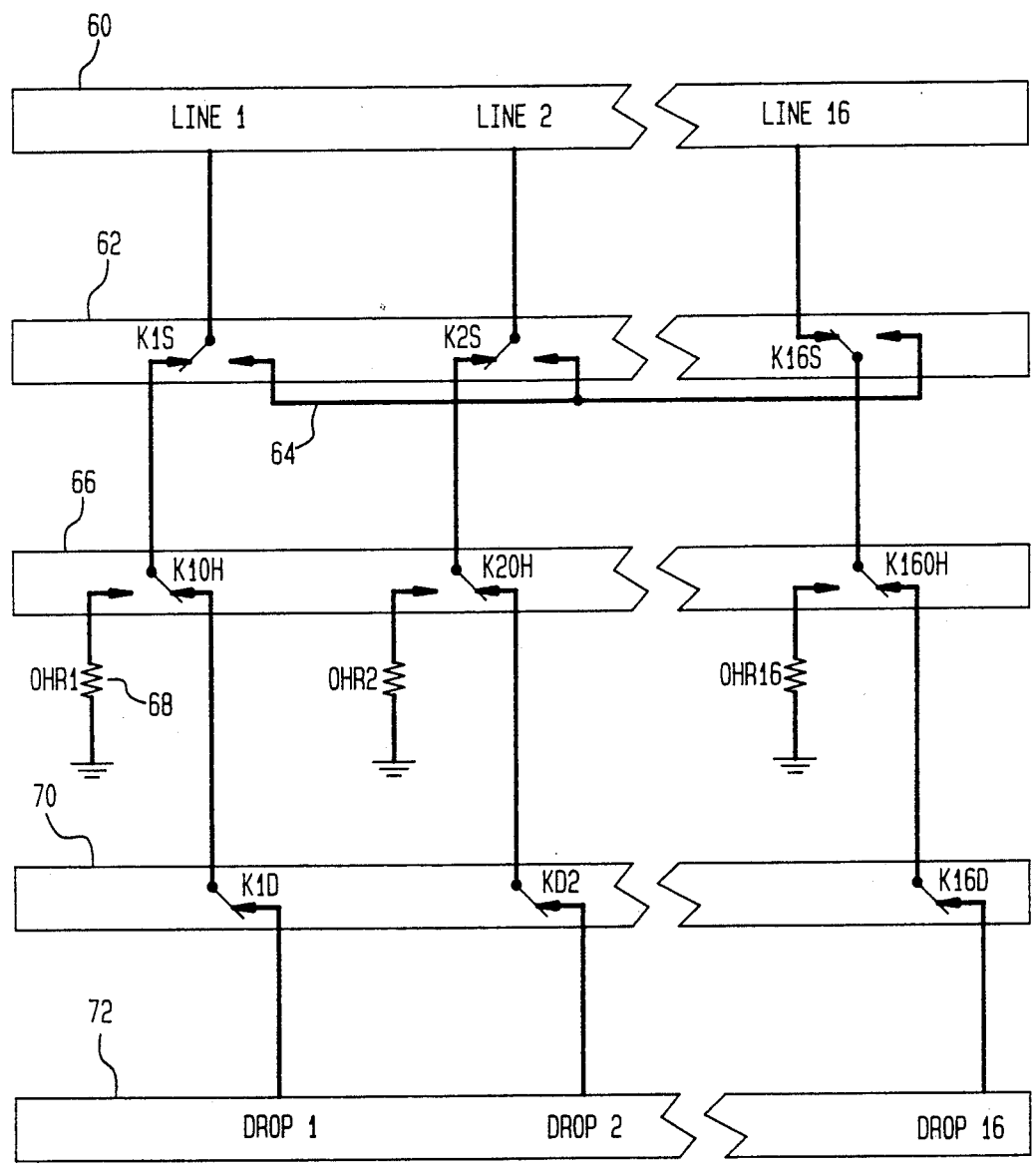

Referring now to FIGS. 3 and 4 and TABLES 1 and 2, and first particularly to FIG. 3, a further understanding of the sequence of signal applications is provided by the timing diagram for the DLMCU monitor. The relationship of RING condition signal 52 to ON HOOK/-OFF HOOK condition 54 and data terminal ready (DTR) 56 is shown. Under normal operating conditions, upon automatic answering the RING condition 52 ceases upon occurrence of an OFF HOOK condition 54 and the DTR signal 56 is used to ascertain the source of a RING-NO-ANSWER condition. (See also the description of the swapout and disconnect circuit FIG. 4, below.) When the DTR 56 signal is down, then the problem is with the computer or data terminal equipment 26. The RING condition 52, the ON HOOK/OFF HOOK condition 54, and the DTR signal 56 are reported by the 24-hour report and the error log record shown in TABLES 1 and 2. For monitoring lease line modems, an auxiliary intercept connector 20 provides a data carrier detect (DCD) signal 58.

TABLE 1

24 HOUR SUMMARY REPORT

Communication Devices, Inc.  12/24/89
GROUP #1 Rotary                DLMCU 24 Hour Summary

| Pos ID | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 7 1027 | . | . | . | . | . | 1 | 2 | 9 | 21 | 33 | 39 | 44 | 53 | 60 | 60 | 60 | 58 | 59 | 60 | 60 | 58 | 24 | 12 | 5 | . |
| 8 1028 | . | . | . | . | . | . | 1 | 6 | 19 | 29 | 36 | 39 | 48 | 60 | 56 | 60 | 57 | 54 | 58 | 60 | 58 | 19 | 11 | 2 | . |
| 9 1029 | . | . | . | . | . | . | . | . | . | . | . | 37 | 46 | 58 | 52 | 60 | 56 | 53 | 57 | 59 | 54 | 12 | 10 | 1 | . |
| 10 1030 | . | . | . | . | . | . | . | 4 | 10 | 20 | 32 | 34 | 41 | 55 | 50 | 58 | 54 | 51 | 53 | 56 | 51 | 8 | 4 | . | . |
| 11 1031 | . | . | . | . | . | . | . | 2 | 7 | 18 | 29 | 28 | 36 | 50 | 47 | 52 | 51 | 45 | 49 | 33 | 21 | 7 | . | . | . |
| 12 1032 | . | . | . | . | . | . | 1 | 5 | 12 | 24 | 25 | 32 | 46 | 44 | 49 | 46 | 43 | 40 | 30 | 10 | 3 | . | . | . | . |
| 13 1033 | . | . | . | . | . | . | . | 3 | 7 | 18 | 20 | 28 | 38 | 37 | 40 | 31 | 32 | 35 | 27 | 8 | . | . | . | . | . |
| 14 1034 | . | . | . | . | . | . | . | 1 | 4 | 6 | 6 | 7 | 9 | 8 | 9 | 8 | 9 | 11 | 12 | 3 | . | . | . | . | . |
| 15 1035 | . | . | . | . | . | . | . | . | . | . | 1 | 3 | . | 4 | 5 | 4 | 3 | 2 | 3 | 2 | . | . | . | . | . |
| 16 1036 | . | . | . | . | . | . | . | . | . | . | . | 1 | . | 2 | 3 | 1 | 2 | 1 | 1 | . | . | . | . | . | . |
| NUMB | . | . | . | 1 | . | 4 | . | 11 | . | 22 | . | 46 | . | 38 | . | 32 | . | 21 | . | 12 | . | 3 | . | . | |
| CALLS | . | . | 2 | . | 6 | . | 17 | . | 29 | . | 38 | . | 41 | . | 34 | . | 21 | . | 10 | . | . | | | | |
| AVE | . | . | 1 | 1 | 5 | 10 | 12 | 11 | 9 | 10 | 10 | 10 | 10 | 9 | 11 | 11 | 14 | 12 | 7 | 4 | 2 | . | . | | |
| CONGEST | . | . | . | . | . | . | . | . | . | 1 | . | 2 | 1 | 1 | 1 | 1 | 1 | . | . | . | . | . | . | | |

TOTAL: # OF CALLS = 338
TOTAL: In Use Min = 3835
Average Length Call = 11.35 Minutes
Total Congested Min = 8
Congested % (Congested Min/Tot in use min × 100) = .02%
Total # Busy/# Min = 4/24
Total # Swap/# Min = 11/26

Communication Devices, Inc.  12/24/89
GROUP #2 Rotary                DLMCU 24 Hour Summary

| Pos ID | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|

TABLE 1-continued

The report for Group #2 and all other groups will follow:

TABLE 2
THE ERROR LOG REPORT

| Communications Devices | | | | Error Log Report |
|---|---|---|---|---|
| DATE | TIME | GROUP # | ID | FAULT |
| 01/16/90 | 10:18 | 1 | 1023 | Lost DTR Signal |
| 01/16/90 | 10:18 | 2 | 1023 | Swapped |
| 01/16/90 | 10:21 | 2 | 1027 | Busied Out |
| 01/16/90 | 10:26 | 2 | 1023 | Swap Restored |
| 01/16/90 | 10:32 | 3 | — | Group Congested |
| 01/16/90 | 10:37 | 3 | — | Congestion Restored |
| 01/16/90 | 10:38 | 2 | 1023 | Swapped |
| 01/16/90 | 10:47 | 2 | 1023 | Swap Restored |
| 01/16/90 | 10:51 | 4 | T1NY | T1NY Link Down |
| 01/16/89 | 11:08 | 4 | T1NY | T1 Link Restored |

Referring now to FIG. 4, three input lines 60 called "LINE 1", "LINE 2", and "LINE 16", respectively, are shown. These input lines 60, ultimately, are provided with corresponding drop connections, DROP 1, DROP 2, and DROP 16, which, in turn, are connected to modems, facsimile devices, telephones, and the like. Although the circuits associated with the telephone lines and drop connections are either 2- or 4-wire circuits, in the schematic representation, for simplicity only one wire is shown. Further, in representing the relay contacts, the contacts are shown in the not energized position as would exist under normal conditions without malfunctioning equipment. The relay configuration is constructed such that a signal flows through input line 60 (LINE 1), from LINE 1 through the SWAPOUT relay 62 (KS1) relay contact, the signal bypasses SWAPOUT buss 64 and continues through the OFF HOOK relay 66 (at the K10H contact). The signal bypasses OFF HOOK resistor 68 and continues through the disconnect relay 70 (K1D contact) to drop connection 72 (DROP 1). If the device connected to this circuit, DROP 1, resulted in a RING-NO-ANSWER condition, then contacts K1S and K16S of SWAPOUT relay 62 are energized which, in turn, disconnects the DROP 1 from LINE 1 and replaces DROP 1 in LINE 1 with DROP 16 in LINE 1. This is accomplished by connecting through SWAPOUT buss 64. At the completion of the call, the relays are restored to the normal condition and LINE 1 is again connected to DROP 1.

During the connect and disconnect, a RING-NO-ANSWER for DROP 1 and the DROP 16 replacement of DROP 1 are reported to the user. Analogously, if the device connected to DROP 2 is in a RING-NO-ANSWER condition, then the contacts KS2 and KS16 of SWAPOUT relay 62 are energized, which, in turn, disconnects DROP 2 from LINE 2 and replaces DROP 2 in LINE 2 with DROP 16 in LINE 2. With the SWAPOUT unit engaged and any additional drop connection 72 in a RING-NO-ANSWER condition, then the corresponding OFF HOOK resistor 68 (OHR-1-OHR15) is connected to the appropriate telephone line. This impedance across the telephone lines simulates a telephone in the OFF HOOK condition, and signals the telephone company that the call has been answered. (Switching this resistor in and out can simulate pulse dialing, and actually dial a remote telephone). If the swapout circuit 62 and 64 is in use and a RING-NO-ANSWER condition is detected on another line, the OFF HOOK contact (OH1 through OH15) for that circuit is closed momentarily to answer the call and then is restored to the open condition. This momentary connection of the incoming call, terminates the call, and thereby avoids waiting by the caller until his system times out. At the completion of this expedited, call-management process, the defective line is removed by the system and the OFF HOOK relay 66 is used to pulse dial a remote telephone. This prevents the next or previous caller from again receiving a RING-NO-ANSWER condition on this circuit. All of the above is reported to the user by the error report log.

When energized, the disconnect relay 70 breaks the telephone company loop current and results in a disconnection of a call. Without a call-in-process, energizing this relay also inhibits the telephone company from ringing the device (modem, telephone, or the like) connected to the associated drop. By way of example and by utilizing the relay configuration just described, the system provides a switch means for automatically transferring an incoming call from a telephone line having a malfunctioning dial-in modem associated therewith to a telephone line having a functioning dial-in modem associated therewith. Further, the modem transmission remains uninterrupted even with a malfunctioning modem in the group. It is also seen as exemplary that the switch means can connect the incoming call to the last in sequence dial-in modem associated the rotary hunt means and can electrically remove the malfunctioning dial-in modem from the sequence by simulating an in-use condition for the malfunctioning dial-in modem.

Although the best mode of the invention has been described herein in some detail, it has not been possible to include each and every variation. Those skilled in the art of dial line monitor and control units will be able to make slight variations in the arrangement suggested hereby without departing from the spirit of the invention and still be within the scope of the claim appended hereto.

What is claimed is:

1. A system for analyzing the status of each one of a group of telephone lines and defects of corresponding equipment attached to respective ones thereof, each said telephone line generating line signals for said corresponding equipment, said system comprising;

plurality of voice frequency intercept means, one for each telephone line, each providing at least two condition signals for examination, said condition signals depending, but isolated, from said line signals;

central processing means for processing the condition signals from each said voice frequency intercept means and, in turn, being responsive to said condition signals, and providing responses identifiable with the use of each said telephone line and with the malfunctioning of each said corresponding equipment;

voice frequency register means for storing said responses for each identifiable telephone line and for each said corresponding equipment;

said central processing means further for examining said voice frequency register means upon acquisition of each said response;

use-reporting means for recording on a periodic basis all responses as to telephone line usage received by said voice frequency register means;

defect-reporting means for recording all responses from said voice frequency register means for the malfunctioning of each said corresponding equipment;

whereby telephone line usage and said corresponding equipment defects are apparent upon examination of said use-reporting and said defect-reporting means.

2. A system as described in claim 1 wherein said voice frequency intercept means further comprises circuit means for generating condition signals by processing non-invasively detected conditions derived by said intercept means from said line signals.

3. A system as described in claim 2 wherein said circuit means includes at least one opto-isolator to provide condition status of said line signals without burdening the telephone line.

4. A system as described in claim 1 wherein said condition signals are a RING condition signal and an ON/OFF HOOK condition signal.

5. A system as described in claim 4 further comprising a display panel means for displaying the RING and OFF HOOK condition for each said telephone line and corresponding equipment.

6. A system as described in claim 5 wherein said display means has a light emitting diode which, when illuminated, shows the presence of the RING and OFF HOOK condition for each said telephone line and corresponding equipment.

7. A system as described in claim 1 wherein said system further comprises:

plurality of RS-232 intercept means, one for each corresponding equipment, each for providing at least one condition signal for examination;

central processing means for processing the condition signals from each said RS-232 intercept means and, in turn, being responsive to said condition signal, and providing responses identifiable with the malfunctioning of each said corresponding equipment; and, RS-232 register means for storing said responses for each identifiable telephone line and for each said corresponding equipment.

8. A system as described in claim 1 wherein said system further comprises one or more rotary hunt means for arranging a plurality of said group of telephone lines for serving the corresponding equipment.

9. A system as described in claim 8 wherein at least a portion of said corresponding equipment is a plurality of dial-in modems in cooperative functional relationship with one of said rotary hunt means and thereby being sequentially accessible.

10. A system as described in claim 9 wherein said system further comprises:

plurality of RS-232 intercept means, one for each corresponding equipment, each providing at least one condition signal for examination;

central processing means for processing the condition signals from each said RS-232 intercept means and, in turn, being responsive to said condition signal, and providing responses identifiable with the malfunctioning of each said corresponding equipment; and, RS-232 register means for storing said responses for each identifiable telephone line and for each said corresponding equipment.

11. A system as described in claim 10 wherein said RS-232 intercept means condition signal for each said dial-in modem is a data terminal ready signal.

12. A system as described in claim 9 wherein said corresponding equipment includes one or more facsimile devices.

13. A system as described in claim 7 wherein said corresponding equipment includes one or more lease-line modems.

14. A system as described in claim 13 wherein said RS-232 intercept means condition signal for each said lease-line modem is a data carrier detect signal.

15. A system as described in claim 9 wherein said system further comprises:

at least one switch means for automatically transferring an incoming call from a malfunctioning dial-in modem to a functioning dial-in modem;

whereby modem transmission remains uninterrupted even with the malfunctioning modem in the group.

16. A system as described in claim 15 wherein said switch means switches said incoming call to the last in sequence dial-in modem associated with said rotary hunt means.

17. A system as described in claim 15 wherein said system further comprises:

delete means for electrically removing said malfunctioning dial-in modem from the sequence with said malfunctioning dial-in modem appearing to be in use.

18. A system for analyzing the status of each one of two groups of telephone lines, defects of corresponding dial-in modems attached to respective ones of the first group thereof, and defects of corresponding lease-line modems attached to respective ones of the second group thereof, said dial-in modems sequentially serving a rotary hunt group of said telephone lines, each said telephone line generating line signals for said modems, said system comprising, in combination:

plurality of voice frequency intercept means, one for each telephone line, each providing at least two condition signals for examination, said condition signals depending, but isolated, from said line signals;

plurality of RS-232 intercept means, at least one for each lease-line modem each for providing for each said lease-line modem at least a data carrier detect (DCD) signal for examination and, when used in conjunction with said dial-in modems, each for providing at least a data terminal ready (DTR) signal for examination;

central processing means for processing the condition signals from each said voice frequency intercept means and for processing DCD and DTR signals from each said RS-232 intercept means, said central processing means providing responses identifiable with each said telephone line and with the malfunctioning of each said modem;

voice frequency register means for storing said responses for each identifiable telephone line and associated modem;

RS-232 register means for storing said responses for each identifiable telephone line and associated modem;

use-reporting means for recording on a periodic basis all responses as to telephone line usage received by said voice frequency register means and said RS-232 register means;

defect-reporting means for recording all responses from said voice frequency register means and said RS-232 register means for the malfunctioning of each said modem;

whereby telephone line usage and said corresponding modem defects are apparent upon examination of said use-reporting and said defect-reporting means.

19. A system as described in claim 18 wherein said voice frequency intercept means further comprises circuit means for generating condition signals by processing non-invasively detected conditions derived by said intercept means from said line signals.

20. A system as described in claim 19 wherein said circuit means includes at least one opto-isolator to provide condition status of said line signals without burdening the telephone line.

21. A system as described in claim 18 wherein said condition signals are a RING condition signal and an ON/OFF HOOK condition signal.

22. A system as described in claim 21 further comprising a display panel means for displaying the RING and OFF HOOK condition for each said telephone line associated with said dial-in modems, and for displaying, presence of DCD signals for each said telephone line associated with said lease-line modem.

23. A system as described in claim 21 wherein said display means has a light emitting diode which, when illuminated, shows the presence of the RING and OFF HOOK condition for each said telephone line associated with said dial-in modems, and for displaying, presence of DCD signals for each said telephone line associated with said lease-line modem.

24. A system as described in claim 18 wherein said system further comprises:

at least one switch means for automatically transferring an incoming call from a malfunctioning dial-in modem to a functioning dial-in modem;

whereby modem transmission remains uninterrupted even with the malfunctioning modem in the group.

25. A system as described in claim 24 wherein said switch means switches said incoming call to the last in sequence dial-in modem associated with said rotary hunt means.

26. A system as described in claim 24 wherein said system further comprises:

delete means for electrically removing said malfunctioning dial-in modem from the sequence with said malfunctioning dial-in modem appearing to be in use.

27. A system as described in claim 9 wherein said RS-232 intercept means further comprises circuit means for automatic disconnection when data transmission has ceased for a predetermined period of time, yet normal disconnect has not occurred.

28. A system as described in claim 18 wherein said RS-232 intercept means further comprises circuit means for automatic disconnection when data transmission has ceased for a predetermined period of time, yet normal disconnect has not occurred.

* * * * *